United States Patent
Komatsu et al.

(10) Patent No.: US 6,288,889 B1
(45) Date of Patent: Sep. 11, 2001

(54) ELECTROLYTIC SOLUTION FOR ELECTROLYTIC CAPACITOR AND ELECTROLYTIC CAPACITOR USING THE SAME

(75) Inventors: Akihiko Komatsu; Tetsushi Ogawara, both of Ina (JP)

(73) Assignee: Rubycon Corporation (JP)

( * ) Notice: Subject to any disclaimer, the term of this patent is extended or adjusted under 35 U.S.C. 154(b) by 0 days.

(21) Appl. No.: 09/451,264

(22) Filed: Nov. 30, 1999

(30) Foreign Application Priority Data

Dec. 1, 1998 (JP) .................................. 10-356901

(51) Int. Cl.[7] ....................................... H01G 4/32
(52) U.S. Cl. .................. 361/511; 361/433; 361/508; 252/62.2
(58) Field of Search .................. 361/433, 319, 361/508, 511, 525, 527, 311, 315; 252/62.2

(56) References Cited

U.S. PATENT DOCUMENTS

| | | |
|---|---|---|
| 4,580,855 | 4/1986 | Niwa . |
| 4,652,968 * | 3/1987 | Shimamoto et al. ............. 361/319 |
| 4,664,830 * | 5/1987 | Shinozaki et al. ............... 252/62.2 |
| 4,734,821 * | 3/1988 | Morimoto et al. ............... 361/433 |
| 4,762,632 | 8/1988 | Shinozaki et al. . |
| 5,055,974 * | 10/1991 | Washio et al. .................. 361/527 |

FOREIGN PATENT DOCUMENTS

| | | |
|---|---|---|
| 32-10531 | 12/1957 | (JP) . |
| 56-73423 | 6/1981 | (JP) . |
| 58-17609 | 2/1983 | (JP) . |
| 61-79219 | 4/1986 | (JP) . |
| 62-2514 | 1/1987 | (JP) . |
| 62-219508 | 9/1987 | (JP) . |
| 62-272514 | 11/1987 | (JP) . |
| 1-168016 | 7/1989 | (JP) . |
| 3-1817 | 1/1991 | (JP) . |
| 3-42695 | 6/1991 | (JP) . |
| 6-151251 | 5/1994 | (JP) . |
| 9-115779 | 5/1997 | (JP) . |
| 9-115780 | 5/1997 | (JP) . |
| 9-115781 | 5/1997 | (JP) . |
| 9-115782 | 5/1997 | (JP) . |

* cited by examiner

*Primary Examiner*—Dean A. Reichard
*Assistant Examiner*—Nguyen Ha
(74) *Attorney, Agent, or Firm*—Wallenstein & Wagner, Ltd.

(57) ABSTRACT

An electrolytic solution for an electrolytic capacitor, which includes (1) a solvent made up of 20 to 80% by weight of an organic solvent and 80 to 20% by weight of water, (2) at least one electrolyte selected from the group consisting of carboxylic acids, salts of carboxylic acids, inorganic acids, and salts of inorganic acids, and (3) a chelate compound. Preferably, an organic acid or salt thereof and an inorganic acid or salt thereof are used in combination. The chelate compound may be selected from the group consisting of ethylenediamine-N,N,N',N'-tetraacetic acid, trans-1,2-diaminocyclohexane-N,N,N',N'-tetraacetic acid monohydrate, N,N-bis(2-hydroxyethyl)glycine, ethylenediamine-N,N,N',N'-tetrakis(methylenephosphonic acid), diethylenetriamine-N,N,N',N'',N''-pentaacetic acid, 1,3-diamino-2-hydroxypropane-N,N,N',N'-tetraacetic acid, ethylenediamine-N,N'-diacetic acid, ethylenediamine-N,N'-bis(methylenephosphonic acid) hemihydrate, O,O'-bis(2-aminoethyl)ethyleneglycol-N,N,N',N'-tetraacetic acid, and N-(2-hydroxyethyl)ethylenediamine-N,N',N'-triacetic acid. An electrolytic capacitor using, as its electrolytic solution, the disclosed electrolytic solution is also disclosed.

20 Claims, 1 Drawing Sheet

ELECTROLYTIC SOLUTION FOR ELECTROLYTIC CAPACITOR AND ELECTROLYTIC CAPACITOR USING THE SAME

BACKGROUND OF THE INVENTION

1. Field of the Invention

The invention relates to an electrolytic capacitor. Particularly, the invention relates to an electrolytic solution for electrolytic capacitor having a low impedance as well as good low temperature stability and other characteristics.

2. Description of the Related Art

A capacitor is a common electrical part and is generally used, in various electric and electronic products, mainly for power supply circuits, noise filters for digital circuits or the like.

Various types of capacitors are currently used. This invention pertains to an aluminum electrolytic capacitor. A typical aluminum electrolytic capacitor is fabricated by etching a high purity aluminum foil to increase its surface area, anodizing a surface of the aluminum foil to provide a dielectric surface film, preparing a laminate made up of the anode foil, an aluminum cathode foil which is opposed to the dielectric surface film of the anode foil and has etched surfaces, and a separator interposed between the anode and cathode foils, winding the laminate to provide an element of a wound structure, impregnating the element with an electrolytic solution, inserting the impregnated element in a case (typically made of aluminum), and sealing the case with an elastic sealant. There are electrolytic capacitors having structures other than such a wound structure.

In such an electrolytic capacitor, the characteristics of an electrolytic solution are important factors for deciding performance of the electrolytic capacitor. Particularly, miniaturization of electrolytic capacitors leads to the use of anode and cathode foils having a higher surface area by etching, which results in a high resistivity in the capacitors. Consequently, an electrolytic solution used in such a capacitor is always required to have a low resistivity (specific resistance) and a high electrical conductivity.

A typical electrolytic solution for a conventional electrolytic capacitor comprises a solvent made up of ethylene glycol (EG) as a main solvent and up to about 10% by weight of additional water, and an electrolyte dissolved in the solvent, the electrolyte being a carboxylic acid such as adipic acid or benzoic acid, or an ammonium salt thereof. Such an electrolytic solution has a specific resistance of the order of 1.5 $\Omega$-m (150 $\Omega$-cm).

Capacitors have to have a low impedance (z). The impedance of a capacitor is decided by various factors. For example, a capacitor having a larger electrode area shows a lower impedance and, accordingly, a larger capacitor naturally attains a lower impedance. In addition, there is approach to attempting to attain a lower impedance by improving a separator. However, particularly in smaller capacitors, the specific resistance of the electrolytic solution is a predominant factor for impedance.

Although electrolytic solutions of an aprotic type having a lower specific resistance (gamma-butyrolactone and the like) have recently been developed (JP-A-62-145713, JP-A-62-145714, and JP-A-62-145715), capacitors using an aprotic-type electrolytic solution have an unsatisfactory impedance compared to solid electrolytic capacitors using an electronic conductor which is known as a low specific resistance electrolyte.

In addition, an aluminum electrolytic capacitor has poorer low temperature stability due to use of an electrolytic solution and, in fact, has a ratio of impedance at $-40°$ C. to impedance at $20°$ C. ($Z(-40°$ C.$)/Z(20°$ C.$)$) of about 40 at 100 kHz, which is significant.

On the other hand, water used as part of a solvent in an electrolytic solution for an aluminum electrolytic capacitor is a chemically active substance for the materials of the anode and cathode foils and, in general, tends to reduce the life of the electrolytic capacitor by acting on the anode and cathode foils (hydration reactions).

SUMMARY OF THE INVENTION

Thus, it is an object of the invention to provide an electrolytic solution for an aluminum electrolytic capacitor having a low impedance, excellent low temperature stability represented by a ratio of impedances at low temperature and normal temperature, and good other characteristics.

It is also an object of the invention to provide, using the electrolytic solution of the invention, an electrolytic capacitor having a lower impedance, improved low temperature stability, and a prolonged life.

The electrolytic solution for an electrolytic capacitor of the invention is characterized by comprising (1) a solvent made up of 20 to 80% by weight of an organic solvent and 80 to 20% by weight of water, (2) at least one electrolyte selected from the group consisting of carboxylic acids, salts of carboxylic acids, inorganic acids, and salts of inorganic acids, and (3) a chelate compound.

The chelate compound in the electrolytic solution of the invention prevents deterioration of aluminum electrode foils by inhibiting a hydration reaction of the electrode foil, to thereby provide an electrolytic capacitor with an elongated life. Use of a combination of an organic electrolyte of a carboxylic acid or salt thereof and an inorganic electrolyte of an inorganic acid or salt thereof has an effect on an electrolytic capacitor to provide it with a much longer life.

The electrolytic capacitor of the invention is characterized by using, as its electrolytic solution, the electrolytic solution of this invention. Specifically, the electrolytic capacitor comprises a sealed case and a wound element contained in the case, the element comprising a laminate made up of an anode foil formed of an aluminum foil having a dielectric surface film formed by anodization, a cathode foil of aluminum opposed to the dielectric surface film of the anode foil, and a separator interposed between the anode and cathode foils, and the element being impregnated with an electrolytic solution, wherein the electrolytic solution comprises (1) a solvent made up of 20 to 80% by weight of an organic solvent and 80 to 20% by weight of water, (2) at least one electrolyte selected from the group consisting of carboxylic acids, salts of carboxylic acids, inorganic acids, and salts of inorganic acids, and (3) a chelate compound. The anode foil may have a dielectric film on both surfaces.

BRIEF DESCRIPTION OF THE DRAWINGS

The above and other objects and advantages of the invention will be well understood and appreciated by a person with ordinary skill in the art, from the following detailed description and the attached drawing, wherein.

DETAILED DESCRIPTION OF THE INVENTION

Figure 1:
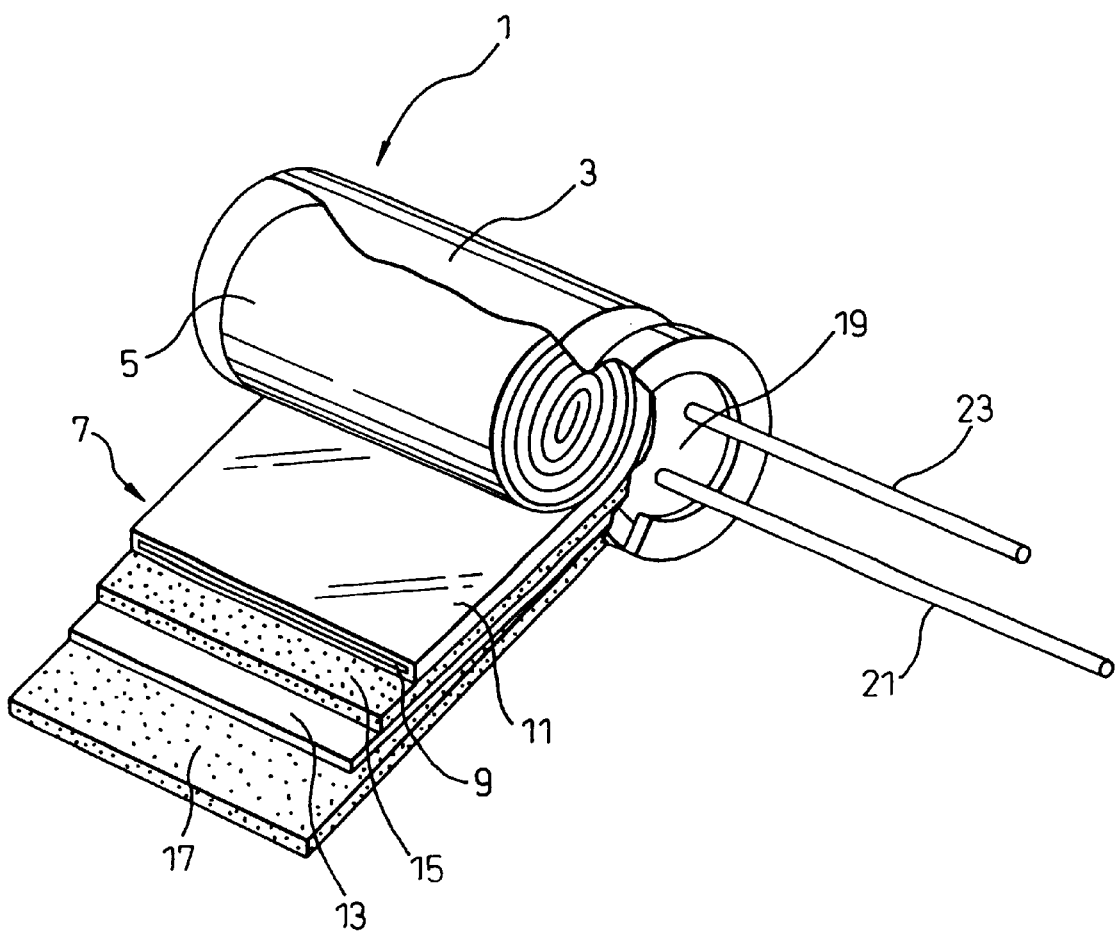
FIG. 1 illustrates an electrolytic capacitor of the invention.

In the electrolytic solution for an electrolytic capacitor of the invention, a solvent is made up of an organic solvent and water.

As the organic solvent, a protic or aprotic solvent can be used. As representative examples of the protic solvents, alcohol compounds can be used. Representative examples of the alcohol compounds include monovalent alcohols such as ethyl alcohol, propyl alcohol and butyl alcohol, divalent alcohols (glycols) such as ethylene glycol, diethylene glycol, triethylene glycol and propylene glycol, and trivalent alcohols such as glycerin and the like. Examples of the aprotic solvents include intramolecular polarization compounds such as lactone compounds, for example, gamma-butyrolactone and the like. In the invention, one or more organic solvents selected from protic and aprotic solvents can be used. A plurality of protic solvents may be used, or a plurality of aprotic solvents may be used. Alternatively, a mixed system of protic and aprotic solvents may also be used.

In addition to the organic solvent, the electrolytic solution of the invention comprises water as a solvent component. Thus, the solvent in the electrolytic solution of the invention is a mixture of an organic solvent and water. In the invention, by use of such a mixed solvent, the freezing point of the solvent can be lowered to thereby improve the impedance characteristics of the electrolytic solution at a low temperature, so that good low temperature stability indicated by a smaller ratio of impedances at low temperature and normal temperature can be achieved. It is preferable that a content of water in solvent is 20 to 80% by weight, the balance being an organic solvent. In the cases of water contents of less than 20% by weight as well as greater than 80% by weight, a degree of freezing point depression of electrolytic solution is insufficient, and it is difficult to attain good low temperature stability of the electrolytic capacitor. More preferably, the content of water in solvent is 30 to 80% by weight, and most preferably 45 to 80% by weight.

As the electrolyte in the electrolytic solution, one or more electrolyte selected from organic acids, in particular preferably carboxylic acids, salts of carboxylic acids, inorganic acids, and salts of inorganic acids, can be used. Carboxylic acids useable in the invention include monocarboxylic acids represented by formic acid, acetic acid, propionic acid, butyric acid, p-nitrobenzoic acid, salicylic acid and benzoic acid, and dicarboxylic acids represented by oxalic acid, malonic acid, succinic acid, glutaric acid, adipic acid, fumaric acid, maleic acid, phthalic acid and azelaic acid. In addition, it is possible to use carboxylic acids having a functional group such as an OH group, for example, citric acid and hydroxybutyric acid. Inorganic acids useable in the invention include phosphoric acid, phosphorous acid, hypophosphorous acid, boric acid, sulfamic acid and the like. As salts of carboxylic acids or inorganic acids, those such as ammonium, sodium, potassium, amine, and alkylammonium salts of the acids enumerated above can be used, the ammonium salts being preferred. Using an inorganic acid or a salt thereof as an electrolyte, consequent freezing point depression of an electrolytic solution can be expected, which is thought to contribute to further improvement in low temperature stability of the electrolytic solution.

An amount of electrolyte to be used in the electrolytic solution of the invention may be arbitrarily determined depending on conditions such as properties required from the electrolytic solution, a type of solvent used, a type of electrolyte used and the like. In general, however, an amount of carboxylic acid or salt thereof is preferred to be of the order of 3 to 30% by weight of the total weight of electrolytic solution. In the case of less than 3% by weight, a desired electrical conductivity cannot be fully achieved, and in the case of greater than 30% by weight, the effect of carboxylic acid or salt thereof approaches or reaches the limit, and the acid or salt becomes difficult to be dissolved in the solvent. For an inorganic acid or salt thereof, an amount of the order of 0.1 to 15% by weight of the total weight of electrolytic solution is preferred. In the case of less than 0.1% by weight, a desired electrical conductivity cannot be fully achieved, and in the case of greater than 15% by weight, the effect of the inorganic acid or salt thereof approaches or reaches the limit, and the acid or salt becomes difficult to dissolve in the solvent. Also, when a carboxylic acid or salt thereof and an inorganic acid or salt thereof are used in combination, they can be used in the above-mentioned ranges.

The electrolytic solution of the invention includes a chelate compound as an additive. The chelate compound used in the invention refers to a compound which coordinates to a metal ion to thereby form a ring structure comprising the metal, which is known as "chelate ring". Representative examples of chelate compounds used in the invention are ethylenediamine-N,N,N',N'-tetraacetic acid (EDTA),

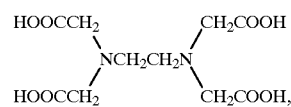

trans-1,2-diaminocyclohexane-N,N,N',N'-tetraacetic acid monohydrate (CyDTA),

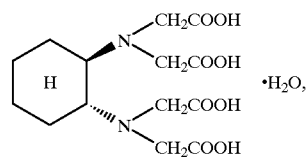

N,N-bis(2-hydroxyethyl)glycine (DHEG),

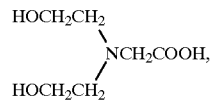

ethylenediamine-N,N,N',N'-tetrakis(methylenephosphonic acid) (EDTPO),

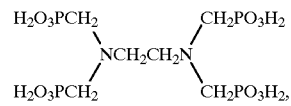

diethylenetriamine-N,N,N',N'',N''-pentaacetic acid (DTPA),

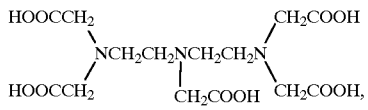

1,3-diamino-2-hydroxypropane-N,N,N',N'-tetraacetic acid (DPTA-OH),

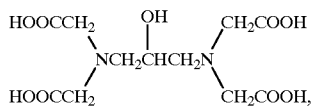

ethylenediamine-N,N'-diacetic acid (EDDA),

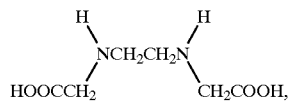

ethylenediamine-N,N'-bis(methylenephosphonic acid) hemihydrate (EDDPO),

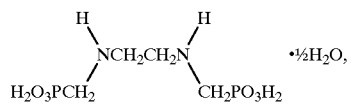

O,O'-bis(2-aminoethyl)ethyleneglycol-N,N,N',N'-tetraacetic acid (GEDTA),

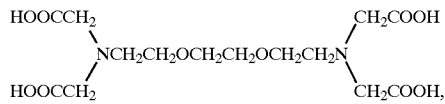

N-(2-hydroxyethyl)ethylenediamine-N,N',N'-triacetic acid (EDTA-OH)

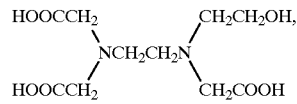

and the like. The chelate compound may be used in any form of acid, salt, ester, anhydride and the like.

It is thought that a chelate compound inhibits a hydration reaction of aluminum electrode foil, in the electrolytic solution of the invention, to thereby prevent deterioration of the electrode foil, and contribute to elongation of life of an electrolytic capacitor. Further, addition of a chelate compound has an accompanied effect in the improvement of corrosion resistance. It is possible to use a mixture of two or more chelate compounds.

An amount of chelate compound to be added in the electrolytic solution of the invention is preferred to be of the order of 0.01 to 3% by weight of the total weight of electrolytic solution. In the case of an amount of chelate compound added of less than 0.01% by weight, the effect in elongation of life of an electrolytic capacitor can scarcely be expected, and in the case of greater than 3% by weight, the effect of chelate compound approaches or reaches the limit, and additionally, the chelate compound causes precipitation in the solution to induce deterioration of low temperature stability of the solution, and furthermore highly increasing the cost of the electrolytic solution itself. More preferably, the chelate compound is added in an amount of 0.05 to 3% by weight of the total weight of the electrolytic solution.

According to the invention, when the above-described mixed solvent is used together with the above-described electrolyte and additive, a specific resistance of an electrolytic solution can be lowered to, for example, the order of 20 $\Omega\cdot cm$, and, in other words, an electrolytic capacitor of lower impedance can be achieved. Since a specific resistance obtained by a conventional electrolytic solution is at best in the order of 150 $\Omega\cdot cm$, as described above, it can be said that the effect in lowering impedance of the invention is remarkable.

The electrolytic solution of the invention can contain, as an additional additive, components other than those described above, as required. Appropriate additional additives include the following compounds:

(a) Gluconic acid and gluconic lactone. An additive of this type is used, in general, in an amount of 0.01 to 5% by weight based on the total weight of an electrolytic solution. Using this additive, the effect of an elongated life of a low impedance capacitor by the inhibition of a hydration reaction on an aluminum electrode foil, improvement of low temperature stability of the electrolytic capacitor, and improvement of corrosion resistance can be achieved. The electrolytic solution of the invention may contain both gluconic acid and gluconic lactone together.

(b) Saccharides, such as glucose, fructose, xylose, and galactose. It is preferred that a saccharide is generally added in the range of 0.01 to 5% by weight. The saccharide can prevent deterioration of electrode foil by inhibiting a hydration reaction on the aluminum electrode foil, and facilitate elongation of the life of an electrolytic capacitor. In the case where a carboxylic acid is used as an electrolyte, the saccharide is also effective in inhibiting the decomposition of it.

(c) Hydroxybenzyl alcohols (in particular, 2-hydroxybenzyl alcohol), L-glutamic acid and salts thereof (for example, Na, K, $NH_4$, amine and alkylammonium salts) and the like. An additive of this type is preferably added, in general, in the range of 0.01 to 5% by weight. The additive prevents deterioration of the electrode foil by inhibiting hydration reaction on aluminum electrode foil, and contributes to elongation of the life of an electrolytic capacitor.

(d) One or more nitro compounds selected from nitrophenol, nitrobenzoic acid, dinitrobenzoic acid, nitroacetophenone and nitroanisole. This additive is used, in general, in an amount of 0.01 to 5% by weight of the total weight of an electrolytic solution. When the additive is used, a conspicuous effect on hydrogen gas absorption is achieved.

The above additives (a) to (d) can be used alone or in combination.

In addition to these additives, a further additive which is commonly used in aluminum electrolytic capacitors or electrolytic capacitors of other types may also be added. Examples of such further additives include mannitol, silane coupling agents, water-soluble silicones, polyelectrolytes and the like.

With conventional electrolytic capacitors, an inorganic acid-based electrolyte was used mainly for capacitors of a moderate to high voltage (160 to 500 volts) type in terms of problems of electrical conductivity and others. The inventors have found that in the case where a carboxylic acid or salt thereof and an inorganic acid or salt thereof are used in combination, as electrolytes, conspicuous elongation of life of an electrolytic capacitor can be achieved compared to the case where each of them is used alone. In addition, when an organic acid-based electrolyte and an inorganic acid-based electrolyte are combined, the combination can be advantageously used even in electrolytic capacitors of a low voltage (less than 160 volts) type.

The electrolytic solution of the invention can be easily prepared by dissolving an electrolyte and a chelate compound in a solvent which is a mixture of an organic solvent and water. Also, when an additional additive selected from (a) to (d) and/or a further additive as set forth above is used, it is sufficient for the preparation of the electrolytic solution of the invention to dissolve them in the solvent.

The electrolytic capacitor of the invention uses, as its electlotylic solution, the electrolytic solution of the invention. Referring to FIG. 1, the capacitor 1 of the invention has a structure similar to that of a conventional electrolytic capacitor which comprises a sealed case 3 and a wound element 5 contained in the case 3. The element 5 comprises a laminate 7 made up of an anode foil 9 formed of an aluminum foil which has a dielectric surface film 11 prepared by anodization, a cathode foil 13 of aluminum opposed to the dielectric surface film 11 of the anode foil 9, and a separator 15 interposed between the anode foil 9 and cathode foil 13. The element 7 is impregnated with the electrolytic solution of the invention set forth above. The laminate 7 is wound together with another separator 17 to provide the wound element 5, and is then positioned in the case 3. The case 3 is sealed by a elastic sealant 19. In FIG. 1, anode lead wire 21 and cathode lead wire 23 are respectively connected to the anode foil 9 and the cathode foil 13 via respective lead tabs (not shown). The electrolytic capacitor of the invention uses the electrolytic solution of the invention, so that it can attain useful effects in improvement of low temperature stability by virtue of a mixed solvent of an organic solvent and water and elongated life by virtue of inhibition of hydration reaction of electrode foils by the addition of chelate compound, as well as effect in lowered impedance.

The invention will now be described in more detail by the following examples, which only exemplify the invention, and are not intended to limit the invention in any way.

COMPARATIVE EXAMPLES A TO C AND EXAMPLES 1 TO 20

Examples of aluminum electrolytic capacitors of wound structure are described herein. An anode of aluminum foil was electrochemically etched, and was anodized to form an oxidized film on its surfaces. A lead tab was then attached to the anodized foil. A cathode aluminum foil was also electrically etched, and a lead tab was then attached to the foil to form an aluminum cathode foil. (Anode and cathode foils may be chemically or electrochemically etched.) Subsequently, a capacitor element was prepared by interposing a separator between the anode and cathode foils and winding the resultant laminate along with another separator. The respective capacitor elements thus prepared were impregnated with respective electrolytic solutions having a composition shown in Tables I to IV, and were then placed in respective aluminum cases having bottoms in such a manner that the lead tab extended out of the case. The respective openings of the cases were sealed by an elastic sealant, to fabricate electrolytic capacitors of wound structure (10 WV–1000 μF).

Specific resistances at 30° C. of the electrolytic solutions used are shown in Tables I to IV. Impedance ratios (Z ratios) of each of the fabricated capacitors represented by a ratio of impedance at low temperature (−40° C.) and impedance at normal temperature (20° C.) were measured at 120 Hz and 100 kHz, and the results are also shown in Tables I to IV. Table I shows comparative examples A to C in which an electrolytic solution containing no chelate compound was used, and Tables II to IV show examples of the invention in which an electrolytic solution to which a chelate compound was added was used.

Furthermore, to evaluate the characteristics of each of the electrolytic capacitors, values of capacitance, tan δ, and leakage current were measured initially and after a lapse of 1000 hours at rated voltage applied at 105° C. The results are also shown in Tables I to IV.

TABLE I

| Compar. Ex. | Compositions Components | wt % | Spec. Resis. @ 30° C. [Ω · cm] | Z ratios 120 Hz [−40/20° C.] | Z ratios 100 kHz [−40/20° C.] | Initial Values Cap. [μF] | Initial Values tan δ [%] | Initial Values Leak. Cur. [μA] | After 1000 hr at 105° C. Cap. [μF] | After 1000 hr at 105° C. tan δ [%] | After 1000 hr at 105° C. Leak. Cur. [μA] |
|---|---|---|---|---|---|---|---|---|---|---|---|
| A | Ethylene glycol<br>Water<br>Ammonium adipate | 60<br>30<br>10 | 85 | 1.3 | 36.1 | 1008 | 7.0 | 6.5 | All safety vents operated before 500 hours lapsed due to gas generation. | | |
| B | Ethylene glycol<br>Water<br>Ammonium adipate | 45<br>40<br>15 | 40 | 1.1 | 9.7 | 1014 | 5.7 | 6.1 | All safety vents operated before 250 hours lapsed due to gas generation. | | |
| C | Ethylene glycol<br>Water<br>Ammonium adipate | 30<br>50<br>20 | 20 | 1.0 | 7.9 | 1023 | 4.7 | 6.9 | All safety vents operated before 250 hours lapsed due to gas generation. | | |

TABLE II

| Ex. | Compositions Components | wt % | Spec. Resis. @ 30° C. [Ω · cm] | Z ratios 120 Hz [−40/20° C.] | Z ratios 100 kHz [−40/20° C.] | Initial Values Cap. [μF] | Initial Values tan δ [%] | Initial Values Leak. Cur. [μA] | After 1000 hr at 105° C. Cap. [μF] | After 1000 hr at 105° C. tan δ [%] | After 1000 hr at 105° C. Leak. Cur. [μA] |
|---|---|---|---|---|---|---|---|---|---|---|---|
| 1 | Ethylene glycol<br>Water<br>Ammonium formate<br>Hypophosphorous acid<br>EDTA | 25.0<br>70.0<br>4.2<br>0.4<br>0.4 | 20 | 1.1 | 4.6 | 1044 | 5.2 | 7.8 | 919 | 6.0 | 2.5 |

TABLE II-continued

|  |  |  | Spec. Resis. | Z ratios | | Initial Values | | | After 1000 hr at 105° C. | | |
|  | Compositions | | @ 30° C. | 120 Hz | 100 kHz | Cap. | tan δ | Leak. Cur. | Cap. | tan δ | Leak. Cur. |
| Ex. | Components | wt % | [Ω · cm] | [−40/20° C.] | [−40/20° C.] | [μF] | [%] | [μA] | [μF] | [%] | [μA] |
|---|---|---|---|---|---|---|---|---|---|---|---|
| 2 | Ethylene glycol | 20.0 | 25 | 1.1 | 4.4 | 1036 | 5.3 | 7.3 | 922 | 5.9 | 2.3 |
|  | Water | 60.0 |  |  |  |  |  |  |  |  |  |
|  | Ammonium glutarate | 18.0 |  |  |  |  |  |  |  |  |  |
|  | Sulfamic acid | 1.6 |  |  |  |  |  |  |  |  |  |
|  | EDTA | 0.4 |  |  |  |  |  |  |  |  |  |
| 3 | Ethylene glycol | 15 | 22 | 1.1 | 3.9 | 1028 | 5.3 | 7.1 | 925 | 5.9 | 2.2 |
|  | Water | 60 |  |  |  |  |  |  |  |  |  |
|  | Ammonium adipate | 24.6 |  |  |  |  |  |  |  |  |  |
|  | EDDA | 0.4 |  |  |  |  |  |  |  |  |  |
| 4 | Ethylene glycol | 24.2 | 20 | 1.1 | 3.8 | 1021 | 5.2 | 6.9 | 930 | 5.8 | 2.2 |
|  | Water | 50.0 |  |  |  |  |  |  |  |  |  |
|  | Ammonium succinate | 25.0 |  |  |  |  |  |  |  |  |  |
|  | Benzenesulfonic acid | 0.4 |  |  |  |  |  |  |  |  |  |
|  | DTPA | 0.4 |  |  |  |  |  |  |  |  |  |
| 5 | Ethylene glycol | 50.0 | 160 | 1.2 | 5.6 | 1015 | 8.7 | 6.3 | 934 | 9.3 | 2.1 |
|  | Water | 40.0 |  |  |  |  |  |  |  |  |  |
|  | Ammonium borate | 9.6 |  |  |  |  |  |  |  |  |  |
|  | EDTA | 0.4 |  |  |  |  |  |  |  |  |  |
| 6 | Ethylene glycol | 55.0 | 28 | 1.0 | 3.7 | 1009 | 5.4 | 6.2 | 938 | 6.0 | 2.2 |
|  | Water | 30.0 |  |  |  |  |  |  |  |  |  |
|  | Ammonium sulfamate | 14.2 |  |  |  |  |  |  |  |  |  |
|  | Phosphoric acid | 0.4 |  |  |  |  |  |  |  |  |  |
|  | EDTA | 0.4 |  |  |  |  |  |  |  |  |  |
| 7 | Ethylene glycol | 60 | 56 | 1.0 | 3.6 | 1002 | 6.1 | 6.4 | 944 | 6.7 | 2.4 |
|  | Water | 20 |  |  |  |  |  |  |  |  |  |
|  | Ammonium adipate | 19.2 |  |  |  |  |  |  |  |  |  |
|  | Boric acid | 0.4 |  |  |  |  |  |  |  |  |  |
|  | EDDA | 0.4 |  |  |  |  |  |  |  |  |  |
| 8 | Ethylene glycol | 63.0 | 91 | 1.0 | 3.8 | 1003 | 7.0 | 6.5 | 942 | 7.6 | 2.4 |
|  | Water | 27.0 |  |  |  |  |  |  |  |  |  |
|  | Ammonium adipate | 9.5 |  |  |  |  |  |  |  |  |  |
|  | EDTPO | 0.1 |  |  |  |  |  |  |  |  |  |
|  | EDTA | 0.4 |  |  |  |  |  |  |  |  |  |

TABLE III

|  |  |  | Spec. Resis. | Z ratios | | Initial Values | | | After 1000 hr at 105° C. | | |
|  | Compositions | | @ 30° C. | 120 Hz | 100 kHz | Cap. | tan δ | Leak. Cur. | Cap. | tan δ | Leak. Cur. |
| Ex. | Components | wt % | [Ω · cm] | [−40/20° C.] | [−40/20° C.] | [μF] | [%] | [μA] | [μF] | [%] | [μA] |
|---|---|---|---|---|---|---|---|---|---|---|---|
| 9 | Ethylene glycol | 40.0 | 38 | 1.0 | 3.6 | 1018 | 5.8 | 6.3 | 937 | 6.4 | 2.1 |
|  | Water | 40.0 |  |  |  |  |  |  |  |  |  |
|  | Ammonium glutarate | 19.6 |  |  |  |  |  |  |  |  |  |
|  | EDTPO | 0.4 |  |  |  |  |  |  |  |  |  |
| 10 | Ethylene glycol | 50.0 | 67 | 1.0 | 3.7 | 1014 | 6.4 | 6.2 | 940 | 7.0 | 2.2 |
|  | Water | 40.0 |  |  |  |  |  |  |  |  |  |
|  | Ammonium adipate | 9.2 |  |  |  |  |  |  |  |  |  |
|  | Sulfamic acid | 0.4 |  |  |  |  |  |  |  |  |  |
|  | EDDA | 0.4 |  |  |  |  |  |  |  |  |  |
| 11 | Ethylene glycol | 25.0 | 21 | 1.1 | 4.6 | 1044 | 5.2 | 7.8 | 919 | 5.8 | 2.5 |
|  | Water | 70.0 |  |  |  |  |  |  |  |  |  |
|  | Ammonium formate | 4.0 |  |  |  |  |  |  |  |  |  |
|  | Hypophosphorous acid | 0.4 |  |  |  |  |  |  |  |  |  |
|  | Gluconic lactone | 0.2 |  |  |  |  |  |  |  |  |  |
|  | EDTA | 0.4 |  |  |  |  |  |  |  |  |  |
| 12 | Ethylene glycol | 20.0 | 26 | 1.1 | 4.4 | 1036 | 5.4 | 7.3 | 922 | 6.0 | 2.3 |
|  | Water | 60.0 |  |  |  |  |  |  |  |  |  |
|  | Ammonium glutarate | 17.8 |  |  |  |  |  |  |  |  |  |
|  | Sulfamic acid | 1.6 |  |  |  |  |  |  |  |  |  |
|  | Gluconic lactone | 0.2 |  |  |  |  |  |  |  |  |  |
|  | EDTA | 0.4 |  |  |  |  |  |  |  |  |  |
| 13 | Ethylene glycol | 15.0 | 23 | 1.1 | 3.9 | 1028 | 5.3 | 7.1 | 925 | 5.9 | 2.2 |
|  | Water | 60.0 |  |  |  |  |  |  |  |  |  |
|  | Ammonium adipate | 24.4 |  |  |  |  |  |  |  |  |  |
|  | Gluconic lactone | 0.2 |  |  |  |  |  |  |  |  |  |
|  | EDDA | 0.4 |  |  |  |  |  |  |  |  |  |

TABLE III-continued

| | Compositions | | Spec. Resis. @ 30° C. | Z ratios | | Initial Values | | | After 1000 hr at 105° C. | | |
| | | | | 120 Hz | 100 kHz | Cap. | tan δ | Leak. Cur. | Cap. | tan δ | Leak. Cur. |
| Ex. | Components | wt % | [Ω · cm] | [−40/20° C.] | [−40/20° C.] | [μF] | [%] | [μA] | [μF] | [%] | [μA] |
| --- | --- | --- | --- | --- | --- | --- | --- | --- | --- | --- | --- |
| 14 | Ethylene glycol | 24.2 | 21 | 1.1 | 3.8 | 1021 | 5.2 | 6.9 | 930 | 5.8 | 2.2 |
| | Water | 50.0 | | | | | | | | | |
| | Ammonium succinate | 24.8 | | | | | | | | | |
| | Benzenesulfonic acid | 0.4 | | | | | | | | | |
| | Gluconic lactone | 0.2 | | | | | | | | | |
| | DTPA | 0.4 | | | | | | | | | |
| 15 | Ethylene glycol | 50.0 | 161 | 1.2 | 5.6 | 1015 | 8.7 | 6.3 | 934 | 9.3 | 2.1 |
| | Water | 40.0 | | | | | | | | | |
| | Ammonium borate | 9.4 | | | | | | | | | |
| | Gluconic lactone | 0.2 | | | | | | | | | |
| | EDTA | 0.4 | | | | | | | | | |

TABLE IV

| | Compositions | | Spec. Resis. @ 30° C. | Z ratios | | Initial Values | | | After 1000 hr at 105° C. | | |
| | | | | 120 Hz | 100 kHz | Cap. | tan δ | Leak. Cur. | Cap. | tan δ | Leak. Cur. |
| Ex. | Components | wt % | [Ω · cm] | [−40/20° C.] | [−40/20° C.] | [μF] | [%] | [μA] | [μF] | [%] | [μA] |
| --- | --- | --- | --- | --- | --- | --- | --- | --- | --- | --- | --- |
| 16 | Ethylene glycol | 55.0 | 29 | 1.0 | 3.7 | 1009 | 5.4 | 6.2 | 938 | 6.0 | 2.2 |
| | Water | 30.0 | | | | | | | | | |
| | Ammonium sulfamate | 14.0 | | | | | | | | | |
| | Phosphoric acid | 2.0 | | | | | | | | | |
| | Gluconic lactone | 0.2 | | | | | | | | | |
| | EDTA | 0.4 | | | | | | | | | |
| 17 | Ethylene glycol | 60.0 | 57 | 1.0 | 3.6 | 1002 | 6.1 | 6.4 | 944 | 6.7 | 2.4 |
| | Water | 20.0 | | | | | | | | | |
| | Ammonium adipate | 19.0 | | | | | | | | | |
| | Boric acid | 0.4 | | | | | | | | | |
| | Gluconic lactone | 0.2 | | | | | | | | | |
| | EDDA | 0.4 | | | | | | | | | |
| 18 | Ethylene glycol | 63.0 | 92 | 1.0 | 3.8 | 1003 | 7.0 | 6.5 | 942 | 7.6 | 2.4 |
| | Water | 27.0 | | | | | | | | | |
| | Ammonium adipate | 9.3 | | | | | | | | | |
| | EDTPO | 0.1 | | | | | | | | | |
| | Gluconic lactone | 0.2 | | | | | | | | | |
| | EDTA | 0.4 | | | | | | | | | |
| 19 | Ethylene glycol | 40.0 | 39 | 1.0 | 3.6 | 1018 | 5.8 | 6.3 | 937 | 6.4 | 2.1 |
| | Water | 40.0 | | | | | | | | | |
| | Ammonium glutarate | 19.6 | | | | | | | | | |
| | Gluconic lactone | 0.2 | | | | | | | | | |
| | EDTPO | 0.4 | | | | | | | | | |
| 20 | Ethylene glycol | 50.0 | 68 | 1.0 | 3.7 | 1014 | 6.4 | 6.2 | 943 | 7.0 | 2.2 |
| | Water | 40.0 | | | | | | | | | |
| | Ammonium adipate | 9.2 | | | | | | | | | |
| | Sulfamic acid | 0.4 | | | | | | | | | |
| | Gluconic lactone | 0.2 | | | | | | | | | |
| | EDDA | 0.4 | | | | | | | | | |

These results reveal that, except for Examples 5 and 15, the specific resistances of the electrolytic solutions of the invention are equivalent to those of the comparative examples, and it is appreciated that these specific resistance values in the invention are smaller compared to those of prior, ordinary electrolytic solutions. Although the specific resistance values in Examples 5 and 15 appear to be high if only data in Tables II to IV are noted, it should be noted that since conventional, ordinary electrolytic solutions have a specific resistance of the order of 150 Ω·cm, the specific resistance values of the electrolytic solutions of Examples 5 and 15 are by no means inferior to those of conventional electrolytic capacitors, and are at a sufficiently practical level, and the electrolytic solutions of the invention achieve a relatively lower impedance in comparison with conventional electrolytic solutions. Accordingly, a capacitor using the electrolytic solution of the invention can achieve a much lower impedance compared to those of prior art and, if not, can achieve an impedance as low as those of prior art.

It should also be appreciated that the capacitors using the electrolytic solution of the invention have a smaller Z ratio. Particularly, it is appreciated that they have a Z ratio at 100 kHz which is restrained to a smaller value compared to those of comparative examples. This means that the electrolytic capacitors using the electrolytic solution of the invention display good low temperature stability over a wide range of frequencies.

In the examples of the invention using the chelate compound additive, stable characteristics were exhibited even after a lapse of 1000 hours at 105° C., and no destruction of the capacitors themselves due to generation of gas was observed. In contrast, in all capacitors of the comparative examples using the electrolytic solution containing no chelate compound additive, a safety vent operated due to gas generation much before the lapse of 1000 hours, and the capacitor became unuseable. Thus, it is appreciated that according to the invention, elongation of life of an electrolytic capacitor can be easily achieved.

EXAMPLES 21 TO 26

Using electrolytic solutions having a composition shown in Table V, electrolytic capacitors were made, and the properties were measured, in the same manner as in the previous examples. In these examples, data for evaluation of change in characteristics were measured after 5000 hours at 105° C.

TABLE V

| | | | Spec. Resis. | Z ratios | | Initial Values | | | After 5000 hr at 105° C. | | |
|---|---|---|---|---|---|---|---|---|---|---|---|
| | Compositions | | @ 30° C. | 120 Hz | 100 kHz | Cap. | tan δ | Leak. Cur. | Cap. | tan δ | Leak. Cur. |
| Ex. | Components | wt % | [Ω · cm] | [−40/20° C.] | [−40/20° C.] | [μF] | [%] | [μA] | [μF] | [%] | [μA] |
| 21 | Ethylene glycol | 25.0 | 20 | 1.1 | 4.6 | 1044 | 5.2 | 7.8 | 877 | 6.0 | 2.3 |
| | Water | 70.0 | | | | | | | | | |
| | Ammonium formate | 4.2 | | | | | | | | | |
| | Hypophosphorous acid | 0.4 | | | | | | | | | |
| | EDTA | 0.4 | | | | | | | | | |
| 22 | Ethylene glycol | 20.0 | 25 | 1.1 | 4.4 | 1036 | 5.3 | 7.3 | 860 | 6.2 | 2.2 |
| | Water | 60.0 | | | | | | | | | |
| | Ammonium glutarate | 18.0 | | | | | | | | | |
| | Sulfamic acid | 1.6 | | | | | | | | | |
| | EDTA | 0.4 | | | | | | | | | |
| 23 | Ethylene glycol | 15.0 | 22 | 1.1 | 3.9 | 1028 | 5.3 | 7.1 | 617 | 7.9 | 1.5 |
| | Water | 60.0 | | | | | | | | | |
| | Ammonium adipate | 24.6 | | | | | | | | | |
| | EDDA | 0.4 | | | | | | | | | |
| 24 | Ethylene glycol | 50.0 | 160 | 1.2 | 5.6 | 1015 | 8.7 | 6.3 | 460 | 15.4 | 1.6 |
| | Water | 40.0 | | | | | | | | | |
| | Ammonium borate | 9.6 | | | | | | | | | |
| | EDTA | 0.4 | | | | | | | | | |
| 25 | Ethylene glycol | 60.0 | 56 | 1.0 | 3.6 | 1002 | 6.1 | 6.4 | 860 | 7.2 | 2.1 |
| | Water | 20.0 | | | | | | | | | |
| | Ammonium adipate | 19.2 | | | | | | | | | |
| | Boric acid | 0.4 | | | | | | | | | |
| | EDDA | 0.4 | | | | | | | | | |
| 26 | Ethylene glycol | 40.0 | 38 | 1.0 | 3.6 | 1018 | 5.8 | 6.3 | 490 | 8.2 | 1.2 |
| | Water | 40.0 | | | | | | | | | |
| | Ammonium glutarate | 19.6 | | | | | | | | | |
| | EDTPO | 0.4 | | | | | | | | | |

All capacitors of Comparative Examples A to C in which the electrolytic solution having no chelate compound was used became unuseable before a lapse of 250 to 500 hours, as indicated above, whereas the capacitors of Examples 21 to 26 were useable even after a lapse of 5000 hours although a reduction in capacitance was observed.

It should further be noted that comparing Examples 21, 22, and 25 using a combination of the organic electrolyte and the inorganic electrolyte with Examples 23, 24, and 26 using only one of the organic and inorganic electrolytes, the former show less reduction of capacitance after 5000 hours than the latter. From this, it is appreciated that using a combination of the organic and inorganic electrolytes in the invention results in further improvement of characteristics of an electrolytic capacitor.

As described above, the invention makes it possible to produce an electrolytic capacitor of high reliability having a lower impedance, and good low temperature stability and other characteristics.

What is claimed is:

1. An electrolytic solution for an electrolytic capacitor, which comprises (1) a solvent made up of 20 to 80% by weight of an organic solvent and 8 to 20% by weight of water, (2) at least one electrolyte selected from the group consisting of carboxylic acids, salts of carboxylic acids, inorganic acids, and salts of inorganic acids, and (3) a chelate compound.

2. The electrolytic solution of claim 1, wherein the organic solvent is at least one solvent selected from protic solvents and aprotic solvents.

3. The electrolytic solution of claim 1, wherein the electrolyte is selected from monocarboxylic acids, dicarboxylic acids, and salts thereof.

4. The electrolytic solution of claim 3, wherein the electrolyte is selected from the group consisting of formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, and ammonium, sodium, potassium, amine and alkylammonium salts thereof.

5. The electrolytic solution of claim 1, wherein the electrolyte is an inorganic acid or a salt thereof selected from the group consisting of phosphoric acid, phosphorous acid, hypophosphorous acid, boric acid and sulfamic acid, and ammonium, sodium, potassium, amine and alkylammonium salts thereof.

6. The electrolytic solution of claim 1, wherein an organic acid or salt thereof and an inorganic acid or salt thereof are used in combination.

7. The electrolytic solution of claim 1, wherein the chelate compound is selected from the group consisting of ethylenediamine-N,N,N',N'-tetraacetic acid, trans-1,2-diaminocyclohexane-N,N,N',N'-tetraacetic acid monohydrate, N,N-bis(2-hydroxyethyl)glycine, ethylenediamine-N,N,N',N'-tetrakis(methylenephosphonic acid), diethylenetriamine-N,N,N',N",N"-pentaacetic acid, 1,3-diamino-2-hydroxypropane-N,N,N',N'-tetraacetic acid, ethylenediamine-N,N'-diacetic acid, ethylenediamine-N,N'-bis(methylenephosphonic acid) hemihydrate, O,O'-bis(2-aminoethyl)ethyleneglycol-N,N,N',N'-tetraacetic acid, and N-(2-hydroxyethyl)ethylenediamine-N,N',N'-triacetic acid.

8. The electrolytic solution of claim 7, wherein the chelate compound is in the form of an acid, a salt, an ester, or an anhydride.

9. The electrolytic solution of claim 1, which contains 0.01 to 3% by weight of chelate compound based on the total weight of the electrolytic solution.

10. The electrolytic solution of claim 1, which further comprises an additional additive selected from the group consisting of gluconic acid and gluconic lactone.

11. An electrolytic capacitor comprising a sealed case and a wound element contained in the case, the element comprising a laminate made up of an anode foil formed of an aluminum foil having a dielectric surface film formed by anodization, a cathode foil of aluminum opposed to the dielectric surface film of the anode foil, and a separator interposed between the anode and cathode foils, and the element being impregnated with an electrolytic solution, wherein the electrolytic solution comprises (1) a solvent made up of 20 to 80% by weight of an organic solvent and 80 to 20% by weight of water, (2) at least one electrolyte selected from the group consisting of carboxylic acids, salts of carboxylic acids, inorganic acids, and salts of inorganic acids, and (3) a chelate compound.

12. The electrolytic capacitor of claim 11, wherein the organic solvent is at least one solvent selected from protic solvents and aprotic solvents.

13. The electrolytic capacitor of claim 11, wherein the electrolyte is selected from monocarboxylic acids, dicarboxylic acids, and salts thereof.

14. The electrolytic capacitor of claim 13, wherein the electrolyte is selected from the group consisting of formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, and ammonium, sodium, potassium, amine and alkylammonium salts thereof.

15. The electrolytic capacitor of claim 11, wherein the electrolyte is an inorganic acid or a salt thereof selected from the group consisting of phosphoric acid, phosphorous acid, hypophosphorous acid, boric acid and sulfamic acid, and ammonium, sodium, potassium, amine and alkylammonium salts thereof.

16. The electrolytic capacitor of claim 11, wherein the electrolytic solution comprises a combination of an organic acid or salt thereof and an inorganic acid or salt thereof.

17. The electrolytic capacitor of claim 11, wherein the chelate compound is selected from the group consisting of ethylenediamine-N,N,N',N'-tetraacetic acid, trans-1,2-diaminocyclohexane-N,N,N',N'-tetraacetic acid monohydrate, N,N-bis(2-hydroxyethyl)glycine, ethylenediamine-N,N,N',N'-tetrakis(methylenephosphonic acid), diethylenetriamine-N,N,N',N'',N''-pentaacetic acid, 1,3-diamino-2-hydroxypropane-N,N,N',N'-tetraacetic acid, ethylenediamine-N,N'-diacetic acid, ethylenediamine-N,N'-bis(methylenephosphonic acid) hemihydrate, O,O'-bis(2-aminoethyl)ethyleneglycol-N,N,N',N'-tetraacetic acid, and N-(2-hydroxyethyl)ethylenediamine-N,N',N'-triacetic acid.

18. The electrolytic capacitor of claim 17, wherein the chelate compound is in the form of an acid, a salt, an ester, or an anhydride.

19. The electrolytic capacitor of claim 11, wherein the electrolytic solution contains 0.01 to 3% by weight of chelate compound based on the total weight of the electrolytic solution.

20. The electrolytic capacitor of claim 11, wherein the electrolytic solution further comprises an additional additive selected from the group consisting of gluconic acid and gluconic lactone.

* * * * *

UNITED STATES PATENT AND TRADEMARK OFFICE
CERTIFICATE OF CORRECTION

PATENT NO. : 6,288,889 B1  
DATED : September 11, 2001  
INVENTOR(S) : Akihiko Komatsu and Tetsushi Ogawara It is certified that error appears in the above-identified patent and that said Letters Patent is hereby corrected as shown below:

<u>Column 13,</u>
Line 66, claim 1 should read:

-- 1. An electrolytic solution for an electrolytic capacitor, which comprises (1) a solvent made up of 20 to 80% by weight of an organic solvent and [8] <u>80</u> to 20% by weight of water, (2) at least one electrolyte selected from the group consisting of carboxylic acids, salts of carboxylic acids, inorganic acids, and salts of inorganic acids, and (3) a chelate compound. --

Signed and Sealed this

Twenty-seventh Day of August, 2002

*Attest:*

JAMES E. ROGAN
*Attesting Officer*  *Director of the United States Patent and Trademark Office*